United States Patent [19]
Taketsugu

[11] Patent Number: 5,583,913
[45] Date of Patent: Dec. 10, 1996

[54] PACKET SIGNAL SELECTING APPARATUS AND MOBILE SWITCHING CENTER INCLUDING THE SAME

[75] Inventor: Masanori Taketsugu, Tokyo, Japan

[73] Assignee: NEC Corporation, Japan

[21] Appl. No.: 207,757

[22] Filed: Mar. 8, 1994

[30] Foreign Application Priority Data

Mar. 8, 1993 [JP] Japan ................................ 5-046475

[51] Int. Cl.⁶ .................................................. H04Q 7/20
[52] U.S. Cl. ........................ 379/58; 370/349; 370/389
[58] Field of Search ............................... 370/94.1, 95.1, 370/103, 60, 61; 379/58, 59, 60, 63; 375/107; 455/33.1, 54.1, 51.1; 371/67.1

[56] References Cited

U.S. PATENT DOCUMENTS 5,195,091  3/1993  Farwell et al. ...................... 370/94.1

FOREIGN PATENT DOCUMENTS 6-30460  2/1994  Japan.
6-30466  2/1994  Japan.
92/00639  1/1992  WIPO.

OTHER PUBLICATIONS

Nakajima, Nobuo, et al., "Design Concept of Digital Mobile Communication Systems", B–317 Proceedings of the 1991 IEICE Spring Conference, pp. 2–317.

Shinagawa, et al., "Digital Mobile Radio Switching System", Globecom '90, vol. 1, Dec. 2, 1990, pp. 485–489.

Ishino, Fumiaki, et al., "Mobile Communication Switching System for Voice/Nonvoice Services", IEEE Globecom '91, pp. 1485–1489, 1991.

Primary Examiner—Curtis Kuntz
Assistant Examiner—Michael B. Chernoff
Attorney, Agent, or Firm—Ostrolenk, Faber, Gerb & Soffen, LLP

[57] ABSTRACT

A mobile switching center of this invention includes a public network interface, a communication signal processing unit for performing code translation, a packet switching unit for performing switching of a packet signal between the communication signal processing unit and a radio base station in accordance with the destination of the packet signal, and a packet signal selecting apparatus. The packet signal selecting apparatus includes one input terminal, a plurality of signal storage sections for respectively storing a plurality of packet signals input through the input terminal, a switching means for distributing a plurality of continuously input packet signals to the plurality of signal storage sections and causing them to respectively store the signals, and a discrimination unit for comparing some or all of the packet signals stored in all the signal storage sections with each other to select one packet signal, and outputting the selected packet signal.

3 Claims, 5 Drawing Sheets

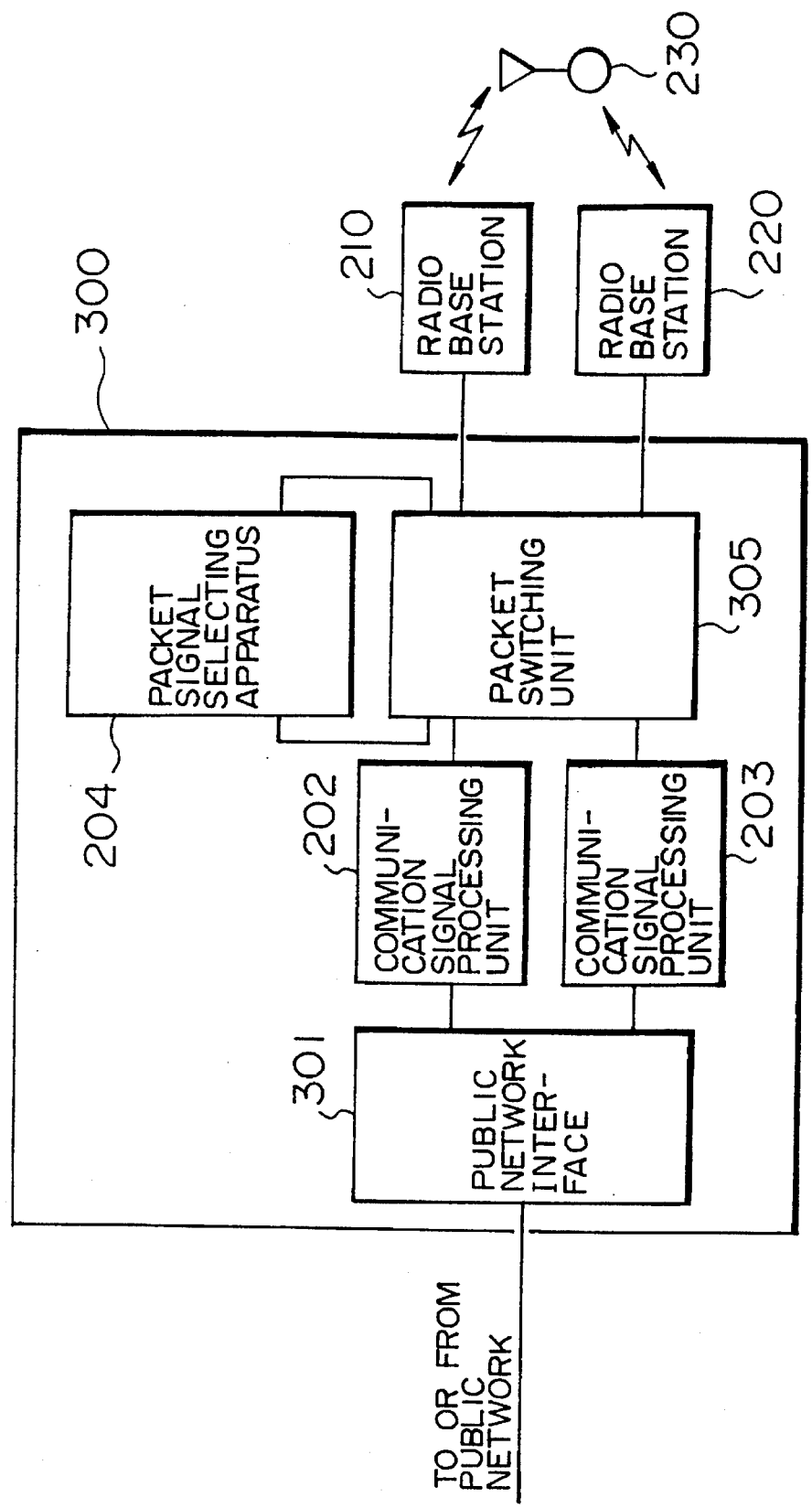

PACKET SIGNAL SELECTING APPARATUS AND MOBILE SWITCHING CENTER INCLUDING THE SAME

BACKGROUND OF THE INVENTION

1. Field of the Invention

The present invention relates to a packet signal selecting apparatus for selecting one of a plurality of packet signals respectively transmitted through a plurality of communication paths in a mobile communication system, and a mobile switching center including the apparatus and realizing macro-diversity.

2. Description of the Prior Art

A conventional mobile communication system for vehicle telephone sets and portable telephone sets uses a small zone scheme of covering the entire service area of a mobile communication system with radio zones at a plurality of locations. In this case, a radio zone is a range in which each radio base station communicates between mobile units mounted in vehicles through radio channels. One radio base station is installed in one radio zone, and a plurality of mobile units freely move between the respective zones. Each radio base station can use a plurality of radio channels and determines a radio channel to be used on the basis of a radio wave propagation environment between mobile units between which communication is to be performed. In addition, if the radio wave propagation environment for a radio channel in use deteriorates during communication, another radio channel is used. This operation is called a "channel switching during voice communication" (handover). A mobile switching center is an apparatus for controlling these radio base stations and performing channel switching with respect to a fixed telephone network.

As shown in FIG. 1, in a digital mobile communication system (Nakajima et al., "Digital Mobile Communication System Plan" in B-317 of Proceedings of the 1991 IEICE Spring Conference, and Ishino et al., "Mobile Communication Switching System for Voice/Nonvoice Services", IEEE GLOBECOM '91, pp. 1485–1489), a mobile switching center 1 is constituted by a mobile switching unit 3 accommodating a nonvoice/ISDN adaptor 2, voice processing units 4 and 5, and a triple connection trunk 6. A radio base station 10 is constituted by modulation/demodulation units 11 and 12, a control unit 13, and common amplifiers 14 and 15. The voice processing units 4 and 5 are signal compressors each constituted by a CODEC and the like.

Channels between the mobile switching center 1 and the radio base station 10 are designed as follows. As for a transmission path 18 for control signals, in order to improve the reliability, 64-kbps channels are duplexed. As for a transmission path 19 for voice signals, 11.2-kbps voice signals output from the voice processing units 4 and 5 on a 64-kpbs transmission path are multiplexed by three-channel time-division multiplexing in a synchronous terminal station 16 on the mobile switching center 1 side, and are shunted in a synchronous terminal station 17 on the radio base station 10 side, thereby achieving a reduction in channel cost. In addition, a triple connection trunk 6 is used to connect an old radio base station, a new base station, and a public network to each other before radio channel switching is performed at the time of handover, thereby preventing a hit.

In the conventional mobile communication system shown in FIG. 1, since the degree of multiplexing in a transmission path needs to be changed in accordance with the bit rates of the voice processing units 4 and 5, it is difficult to use different bit rates. In addition, the triple connection trunk 6 specially designed for triple connection is required at the time of handover. In order to compensate for these drawbacks, a scheme of using packet signals for transmission between a mobile switching center and a radio base station has been proposed (Japanese Patent Application Nos. 4-181405 and 4-183269). When packet transmission is performed between a mobile switching center and a radio base station, various bit rates can be used by changing the number of packet signals transmitted per unit time. Therefore, multiple connection can be realized by only copying a packet signal and changing the destination address of each packet signal, and no special device such as the triple connection trunk 6 is required.

Furthermore, attempts have been made to use a hand-off scheme of preventing a hit at the time of handover and compensating for a deterioration in signal quality by using macro-diversity in which radio signals from a mobile unit are received by a plurality of radio base stations to improve the signal quality (refer to "International Publication No. WO92/0063 published Jan. 9, 1992"). In order to realize macro-diversity, a mobile switching center 50 is designed as follows. As shown in FIG. 2, signals from a plurality of radio base stations are subjected to switching in a digital switching unit 52. Thereafter, these signals are output, as one signal, from a diversity synthesizer 55 to a voice processing unit 54. The signal is then connected to a public network through a digital switching unit 51 or is returned by the digital switching unit 51 to be connected to a mobile unit within a mobile communication network through the voice processing unit 54 and the digital switching unit 52.

In the conventional mobile switching center shown in FIG. 2, however, since the diversity synthesizer 55 is directly connected to the voice processing unit 54, diversity synthesizers 55 equal to voice processing units 54 in number are required. In addition, in communication between mobile units, a voice signal passes through the voice processing unit 54 twice, resulting in a deterioration in signal quality. Furthermore, since the diversity synthesizer 55 receives signals from the digital switching unit 52 through a plurality of input terminals, complicated input destination management is required in the digital switching unit 52 for signals from radio base stations.

SUMMARY OF THE INVENTION

The present invention has been made in consideration of the above situation, and has as its first object to provide a packet signal selecting apparatus which can unify the destination addresses of packet signals from a plurality of communication paths into one designation address so as to facilitate management of the designation addresses of packet signals.

It is the second object of the present invention to provide a mobile switching center which performs switching of a signal after the signal is selected by a packet signal selecting apparatus, thereby preventing a deterioration in signal quality and obtaining a diversity effect.

It is the third object of the present invention to provide a mobile switching center which realizes the functions of a plurality of packet switching units by using only one packet switching unit, thereby simplifying the arrangement.

In order to achieve the first object, according to the first aspect of the present invention, there is provided a packet signal selecting apparatus arranged in a mobile switching center in a mobile communication system including a plurality of mobile units, a plurality of radio base stations, each performing communication between the plurality of mobile units in a self-radio zone through a radio channel, and the mobile switching center for performing general control over the plurality of radio base stations, in which system signals are transmitted, in the form of packet signals, between the mobile switching center and the plurality of radio base stations, the packet signal selecting apparatus being designed to select one of a plurality of packet signals transmitted through a plurality of communication paths so as to provide the mobile switching center with a function of continuously relaying the respective packet signals from the plurality of mobile units regardless of quality of the plurality of communication paths, comprising an input terminal, a plurality of signal storage sections for respectively storing a plurality of packet signals input through the input terminal, switching means for distributing a plurality of packet signals continuously input through the input terminal to the plurality of signal storage sections and causing the signal storage sections to respectively store the packet signals, and a discrimination unit, connected to all the signal storage sections, for comparing some or all of the packet signals stored in all the signal storage sections with each other to select one packet signal, and outputting the selected packet signal.

In order to achieve the second object, according to the second aspect of the present invention, there is provided a mobile switching center in a mobile communication system comprising a plurality of mobile units, a plurality of radio base stations, each performing communication between the plurality of mobile units in a self-radio zone through a radio channel, and the mobile switching center for performing general control over the plurality of radio base stations, in which system signals are transmitted, in the form of packet signals, between the mobile switching center and the plurality of radio base stations, wherein an input terminal of a packet signal selecting apparatus for selecting one of a plurality of packet signals transmitted through a plurality of communication paths is connected to a first packet switching unit serving as an interface between the plurality of radio base stations, and a communication signal processing unit connected to an interface for a public network is connected to an output terminal of the packet signal selecting apparatus through a second packet switching unit.

In order to achieve the third object, according to the third aspect of the present invention, there is provided a mobile switching center in a mobile communication system comprising a plurality of mobile units, a plurality of radio base stations, each performing communication between the plurality of mobile units in a self-radio zone through a radio channel, and the mobile switching center for performing general control over the plurality of radio base stations, in which system signals are transmitted, in the form of packet signals, between the mobile switching center and the plurality of radio base stations, wherein an input terminal of a packet signal selecting apparatus for selecting one of a plurality of packet signals transmitted through a plurality of communication paths is connected to a first packet switching unit serving as an interface between the plurality of radio base stations, and a communication signal processing unit connected to an interface for a public network is connected to the packet switching unit.

According to the first aspect of the present invention, as in a digital automobile telephone system in Japan ("Digital Automobile Telephone System", RCR STD-27, Radio System Development Center Foundation), the period of a signal generated by a modulation/demodulation unit in a radio base station is as large as 20 msec, and packet signals are not continuously input from the same modulation/demodulation unit to a packet signal selecting apparatus. For this reason, even if packet signals to which discrimination data indicating signal-to-noise ratios or signal quality are added in a radio base station are input to a packet signal selecting apparatus through one input terminal, one packet signal is output by comparing/selecting the packet signals, stored in signal storage sections, using the discrimination data. Therefore, even if signals from the same mobile unit are simultaneously received by a plurality of radio base stations and transmitted to a mobile switching center, only one destination address needs to be set for packet signals from a plurality of communication paths, thereby facilitating management of the destination addresses of packet signals.

According to the second aspect of the present invention, by arranging a packet switching unit between a communication signal processing unit, such as a voice processing unit or a fax signal processing unit, and the packet signal selecting apparatus, communication signal processing units and packet signal selecting apparatuses can be freely combined with each other. Since a packet signal selecting apparatus is not used in some case, the number of packet signal selecting apparatuses can be set to be much smaller than that of communication signal processing units. In addition, since switching of packet signals is performed in the packet switching unit, communication between mobile units can also be performed without causing a deterioration in signal quality which is caused when communication is performed through a communication signal processing unit. In addition, a diversity effect can be obtained.

According to the third aspect of the present invention, since a packet switching unit between a communication signal processing unit and a packet signal processing unit and a packet switching unit serving as an interface with respect to a radio base station are realized by one packet switching unit, the arrangement of a mobile switching center can be simplified.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

BRIEF DESCRIPTION OF THE DRAWINGS

FIG. 7 is a block diagram showing the arrangement of another embodiment of a mobile switching center according to the present invention.

DETAILED DESCRIPTION OF THE PREFERRED EMBODIMENTS

The present invention will be described in detail with reference to several preferred embodiments in conjunction with the accompanying drawings.

Figure 1:
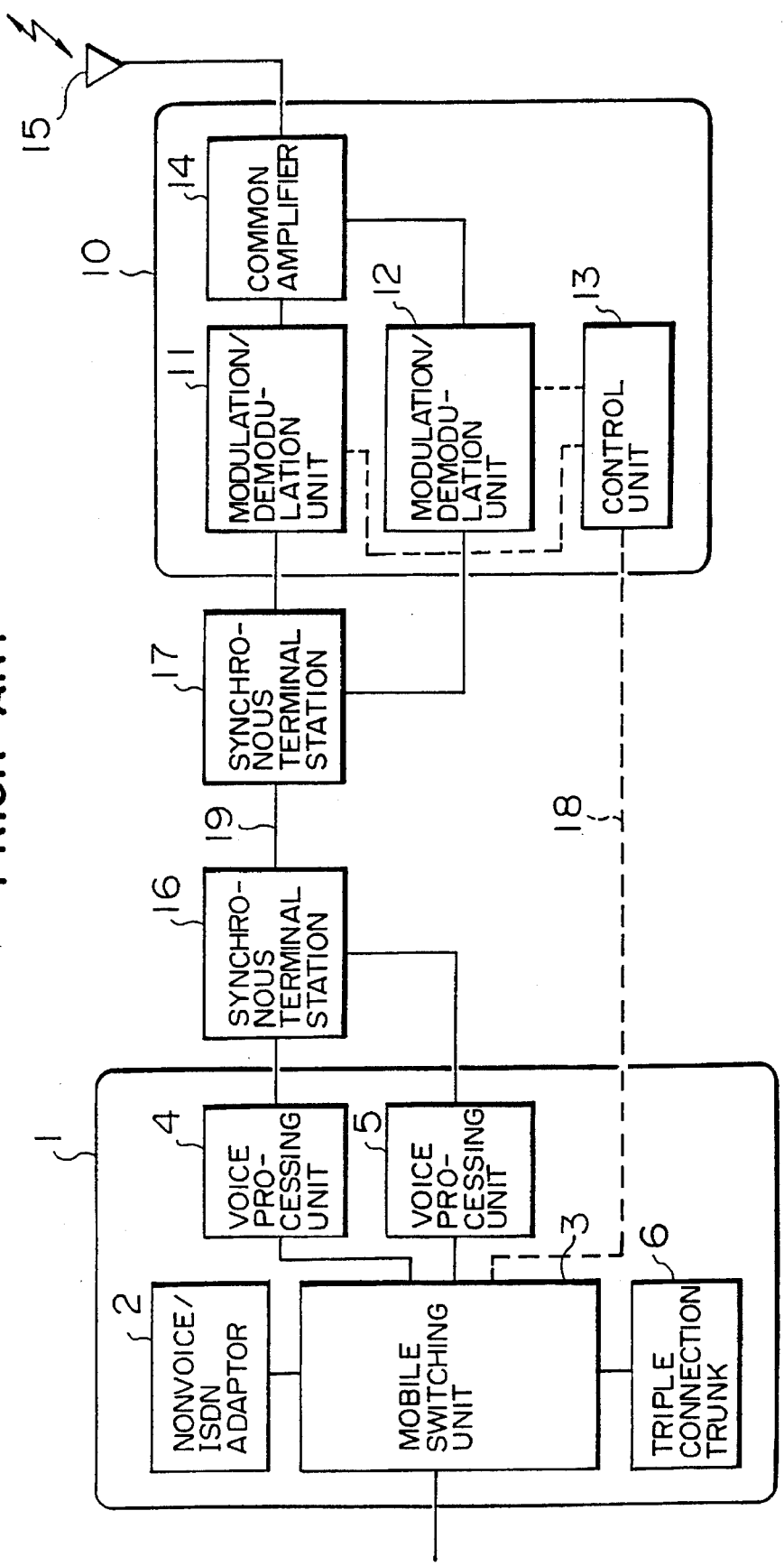
FIG. 1 is a block diagram showing the arrangement of a mobile switching communication system using a conventional mobile switching center.
Figure 2:
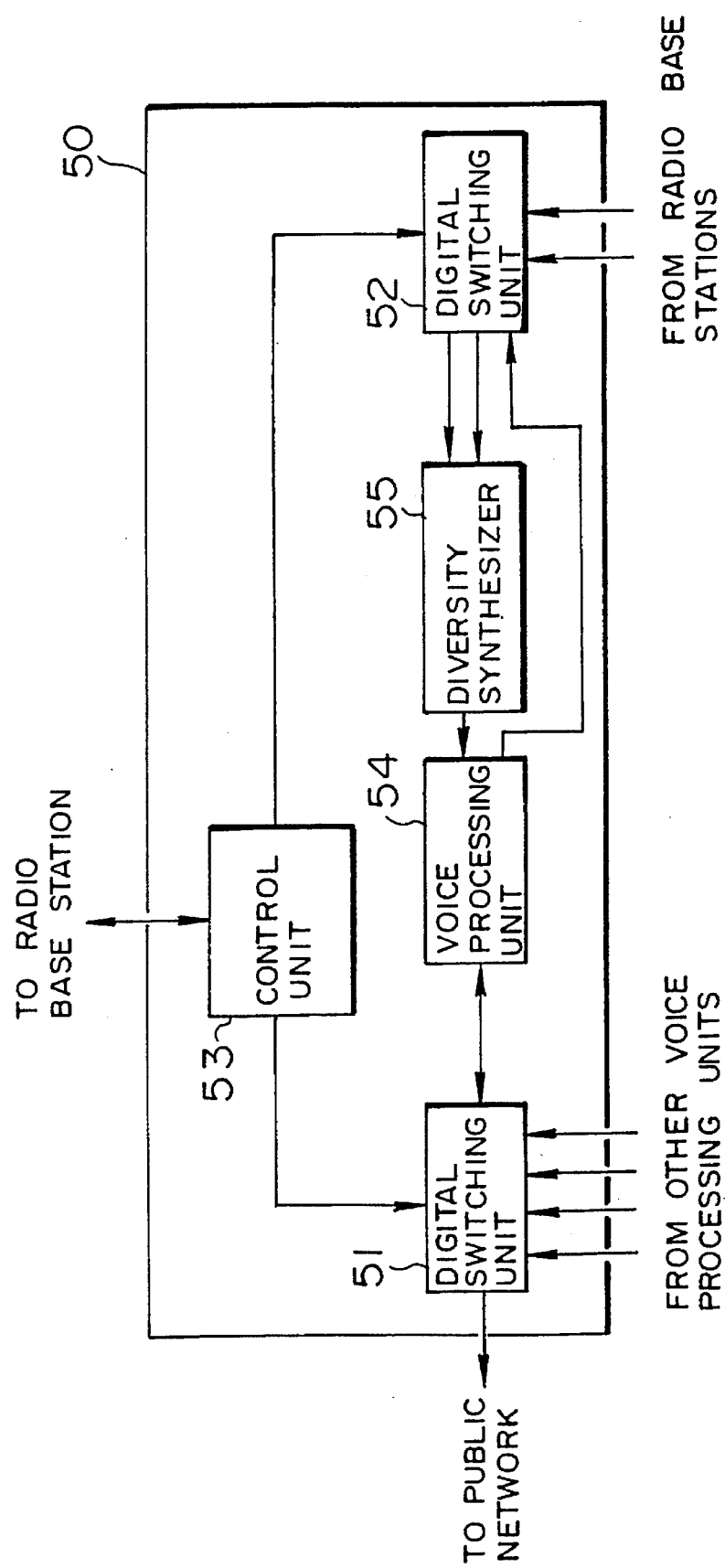
FIG. 2 is a block diagram showing the arrangement of a conventional mobile switching center designed to realize macro-diversity.
Figure 3:
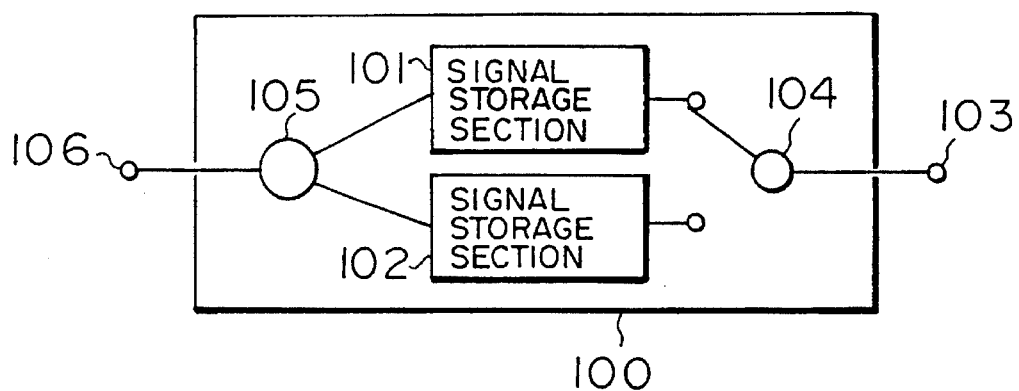
FIG. 3 is a block diagram showing the arrangement of an embodiment of a packet signal selecting apparatus according to the present invention.
Figure 4:
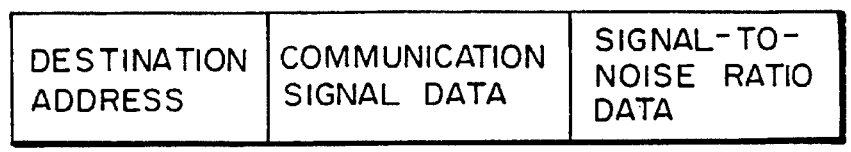
FIG. 4 shows an example of the format of a packet signal transmitted between a radio base station and a mobile communication control station.

FIG. 3 shows the arrangement of the first embodiment of a packet signal selecting apparatus according to the present invention. Referring to FIG. 3, reference numeral 100 denotes a packet signal selecting apparatus; 101 and 102, signal storage sections; 103, an input terminal; 104, a switch; 105, a discrimination unit; and 106, an output terminal. FIG. 4 shows the format of a packet signal transmitted between a radio base station and a mobile switching center.

Assume that the switch 104 is connected to the Signal storage section 101 in an initial condition. When a signal from a mobile unit is received at a radio base station, a signal-to-noise ratio is added, as discrimination data, to the signal to form a packet signal. Note that as the discrimination data, signal quality data may be used. The packet signal input through the input terminal 103 is stored in the signal storage section 101 through the switch 104. Thereafter, the switch 104 switches the packet signal input designation to the signal storage section 102. The discrimination unit 105 compares the discrimination data in packet signals stored in the signal storage sections 101 and 102 with each other at predetermined time intervals. If a packet signal stored in the signal storage section 101 is selected on the basis of the discrimination data, the discrimination unit 105 outputs the selected packet signal and erases the packet signals stored in the signal storage sections 101 and 102.

Figure 5:
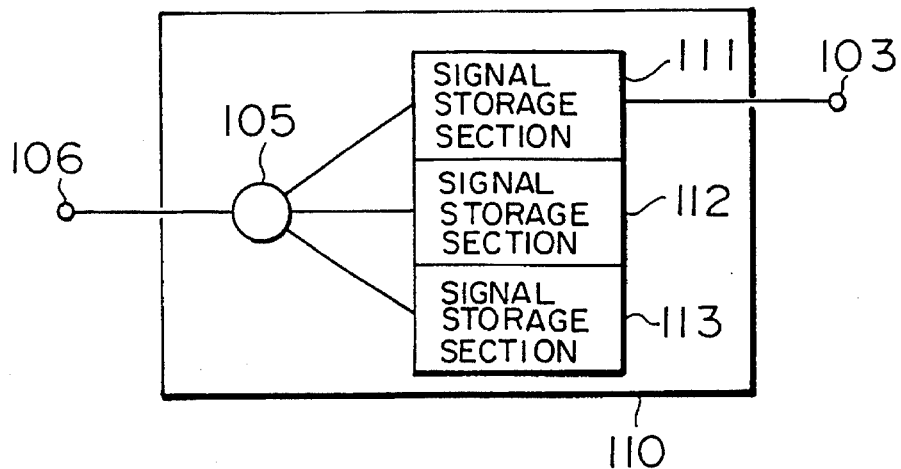
FIG. 5 is a block diagram showing the arrangement of another embodiment of a packet signal selecting apparatus according to the present invention.

FIG. 5 shows the arrangement of the second embodiment of a packet signal selecting apparatus defined in claim 1. Referring to FIG. 5, reference numeral 110 denotes a packet signal selecting apparatus; 111, 112, and 113, signal storage sections, each having the function of a shift register; 103, an input terminal; 105, a discrimination unit; and 106, an output terminal.

A packet signal input through the input terminal 103 is stored in the signal storage section 111 first. When the next packet signal is input, the packet signal stored in the signal storage section 111 is shifted to the signal storage section 112, and the newly input packet signal is stored in the signal storage section 111. The discrimination unit 105 compares the discrimination data in packet signals stored in the signal storage sections 111, 112, and 113 with each other at predetermined time intervals. If a packet signal stored in the signal storage section 111 is selected on the basis of the discrimination data, the discrimination unit 105 outputs the selected packet signal to the output terminal 106 and erases the packet signals stored in the signal storage sections 111, 112, and 113.

Figure 6:
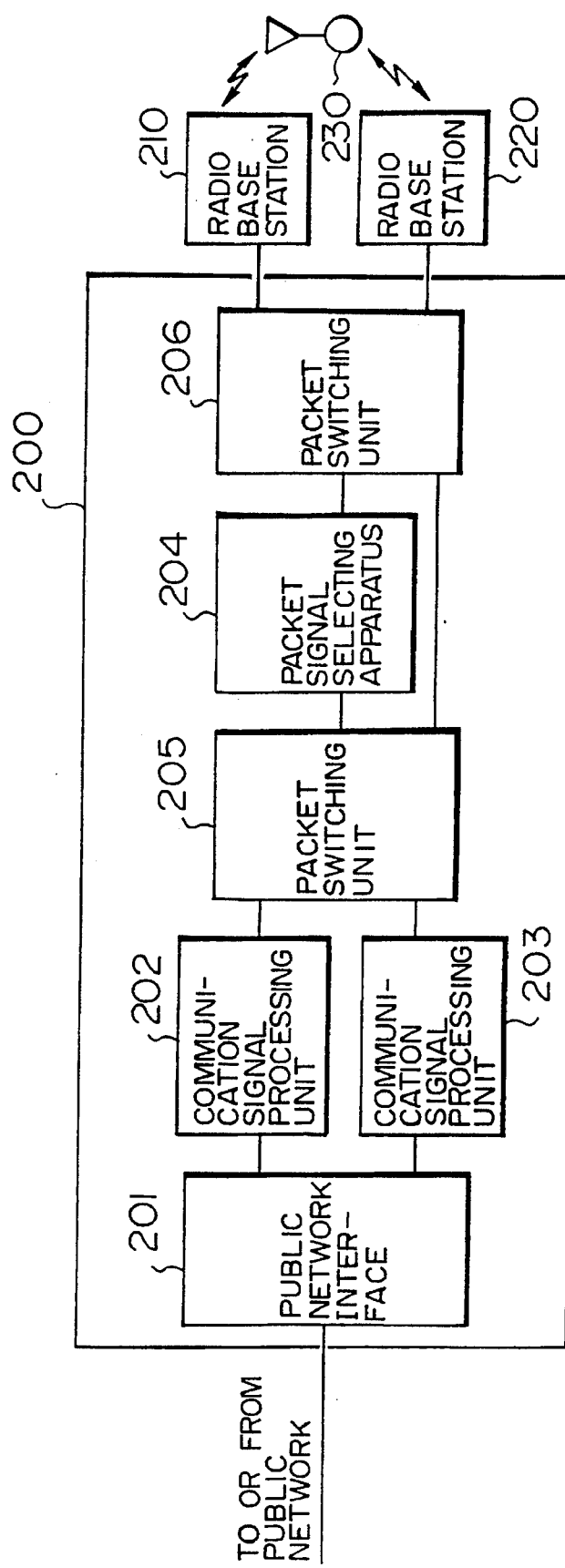
FIG. 6 is a block diagram is a block diagram showing the arrangement of an embodiment of a mobile switching center according to the present invention.

FIG. 6 shows the arrangement of an embodiment of a mobile switching center according to the present invention defined in claim 2. Referring to FIG. 6, reference numeral 200 denotes a mobile switching center; 201, a public network interface for interfacing between a public network and a mobile communication network; 202 and 203, communication signal processing units; 204, a packet signal selecting apparatus; 205 and 206, packet switching units; 210 and 220, radio base stations; and 230, a mobile unit. Note that the packet signal selecting apparatus 204 may be a packet signal selecting apparatus realized by the invention according to a first embodiment thereof or a packet signal selecting apparatus having a plurality of input terminals. The communication signal processing units 202 and 203 correspond to voice processing units 4 and 5 and serve to compress signals. The voice processing units 4 and 5 are designed to process only voice signals. In contrast to this, the communication signal processing units 202 and 203 are designed to process FAX signals and data as well as voice signals.

Assume that signals transmitted from the mobile unit 230 are received by the radio base stations 210 and 220. In this case, the radio base stations 210 and 220 respectively add data representing signal-to-noise ratios, obtained at the time of reception, to the signals to form packet signals, and transmit the packet signals to the mobile switching center 200. Since the signals from the same mobile unit are simultaneously received by the plurality of radio base stations, the respective packet signals are input to the packet signal selecting apparatus 204 through the packet switching unit 206. The packet signal selecting apparatus 204 compares the signal-to-noise ratio data of the two packet signals with each other, and outputs a packet signal having a higher signal-to-noise ratio to the packet switching unit 205. When a partner is present in the public network, the packet signal received by the packet switching unit 205 is decoded by the communication signal processing unit 202, and the resultant signal is transmitted to the public network through the public network interface 201. If the partner is present in the same mobile communication network, the packet signal is returned from the packet switching unit 205 to be transmitted to the partner. With this operation, communication between mobile units in the same mobile communication network can be performed without the mediacy of a communication signal processing unit, thereby preventing a deterioration in signal quality caused when a signal passes through a communication signal processing unit twice. Assume that a signal transmitted from the mobile unit 230 is received by only the radio base station 210. In this case, the packet signal transmitted to the packet switching unit 206 is transferred to the packet switching unit 205 without the intervention of the packet signal selecting apparatus 204 even if a partner is present in the public network. The signal is then transmitted to the public network through the communication signal processing unit 202 (or 203) and the public network interface 201. With this operation, the required number of packet signal selecting apparatuses 204 is smaller than the number of communication signal processing units, thereby achieving a reduction in size of the overall arrangement.

FIG. 7 shows the arrangement of another embodiment of a mobile switching center according to the present invention. Referring to FIG. 7, reference numeral 300 denotes a mobile switching center; 301, an interface for interfacing between a public network and a mobile communication network; 202 and 203, communication signal processing units; 204, a packet signal selecting apparatus; 305, a packet switching unit; 210 and 220, radio base stations; and 230, a mobile unit. Note that the packet signal selecting apparatus 204 may be a packet signal selecting apparatus realized by the invention according to the first embodiment thereof or a packet signal selecting apparatus having a plurality of input terminals.

Assume that signals transmitted from the mobile unit 230 are received by the radio base stations 210 and 220. In this case, the radio base stations 210 and 220 respectively add data indicating signal-to-noise ratios, obtained at the time of reception, to the signals to form packet signals, and transmit the packet signals to the mobile switching center 300. Since the signals from the same mobile unit are simultaneously received by the plurality of radio base stations, the respective packet signals are input to the packet signal selecting apparatus 204 through the packet switching unit 305. The packet signal selecting apparatus 204 compares the signal-to-noise ratio data of the received two packet signals with each other, and outputs a signal having a higher signal-to-noise ratio to the packet switching unit 305. The packet signal transferred to the packet switching unit 305 is decoded by the communication signal processing unit 202 when a partner is present in the public network. The resultant signal is then transmitted to the public network through the public network interface 301. If the partner is present in the same mobile communication network, the packet signal is returned by the packet switching unit 305 to be transmitted to the partner. With this operation, communication between mobile units in the same mobile communication network can be performed without the intervention of a communication signal processing unit, thereby preventing a deterioration in signal quality caused when a signal passes through a communication signal processing unit twice. Assume that a signal transmitted from the mobile unit 230 is received by only the radio base station 210. In this case, the packet signal transmitted to the packet switching unit 306 is transmitted to the public network through the communication signal processing unit 202 (or 203) and the public interface 301 without the mediacy of the packet signal selecting apparatus 204 even if a partner is present in the public network. With this operation, the required number of packet signal selecting apparatuses 204 is smaller than the number of communication signal processing units, thereby achieving a reduction in size of the overall arrangement. Note that in this embodiment, the packet switching unit arranged between the communication signal processing units 202 and 203 and the packet signal selecting apparatus 204, and the packet switching unit serving as an interface between the radio base stations 210 and 220 in the embodiment shown in FIG. 6 are realized by one packet switching unit, thereby simplifying the arrangement of the mobile switching center in FIG. 6.

What is claimed is:

1. A packet signal selecting apparatus for a mobile communication system, said system including a plurality of mobile units, a plurality of radio base stations, each said base station communicating through a radio channel With said plurality of mobile units in a radio zone to which said mobile units are assigned, and a mobile switching center for controlling said plurality of radio base stations, in which signals are transmitted, in the form of packet signals, between said mobile switching center and said plurality of radio base stations, said packet signal selecting apparatus being designed so as to select one of a plurality of packet signals transmitted through a plurality of communication paths, so that said packet signal selecting apparatus provides said mobile switching center with means for continuously relaying the respective packet signals from said plurality of mobile units regardless of the quality of the plurality of communication paths, said apparatus comprising:

an input terminal;

a plurality of signal storage sections for respectively storing a plurality of packet signals input through said input terminal;

switching means for distributing a plurality of packet signals continuously input through said input terminal to said plurality of signal storage sections and causing said signal storage sections to respectively store the packet signals; and a discrimination unit, connected to all said signal storage sections, for comparing some or all of the packet signals stored in all said signal storage sections with each other to select one packet signal, and outputting the selected packet signal.

2. A mobile switching center for a mobile communication system comprising a plurality of mobile units, a plurality of radio base stations, each said base station providing communication between said plurality of mobile units in a radio zone to which said mobile units are assigned, said mobile switching center being effective for providing overall control over said plurality of radio base stations, in which system signals are transmitted, in the form of packet signals, between said mobile switching center and said plurality of radio base stations, an input terminal of a packet signal selecting apparatus for selecting one of a plurality of packet signals transmitted through a plurality of communication paths being connected to a first packet switching unit serving as an interface between said plurality of radio base stations, and a communication signal processing unit connected to an interface for a public network being connected to an output terminal of said packet signal selecting apparatus through a second packet switching unit.

3. A mobile switching center for a mobile communication system comprising a plurality of mobile units, a plurality of radio base stations, each said base station providing communication between said plurality of mobile units in a radio zone to which said mobile units are assigned, said mobile switching center being effective for providing overall control over said plurality of radio base stations, in which system signals are transmitted, in the form of packet signals, between said mobile switching center and said plurality of radio base stations, an input terminal of a packet signal selecting apparatus for selecting one of a plurality of packet signals transmitted through a plurality of communications paths being connected to a first packet switching unit serving as an interface between said plurality of radio base stations, and a communication signal processing unit connected to an interface for a public network being connected to said packet switching unit.

\* \* \* \* \*